United States Patent
Ferraris et al.

(10) Patent No.: US 7,135,241 B2
(45) Date of Patent: Nov. 14, 2006

(54) LIGHT-EMITTING BLOCK COPOLYMERS COMPOSITION, PROCESS AND USE

(75) Inventors: John P. Ferraris, Coppell, TX (US); Jose J. Gutierrez, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 313 days.

(21) Appl. No.: 10/155,390

(22) Filed: May 24, 2002

(65) Prior Publication Data

US 2003/0222246 A1   Dec. 4, 2003

(51) Int. Cl.
  *H01L 51/54* (2006.01)
  *H05B 33/14* (2006.01)
  *C09K 11/06* (2006.01)
  *C08G 61/00* (2006.01)

(52) U.S. Cl. .................. 428/690; 428/917; 313/504; 257/40; 257/E51.031; 257/E51.036; 252/301.35; 528/12; 528/25; 528/42; 528/43; 528/397; 528/425

(58) Field of Classification Search ............. 428/690, 428/917; 313/504; 257/40; 528/32, 42, 528/43, 397; 526/294, 346, 347; 252/301.35
See application file for complete search history.

(56) References Cited

U.S. PATENT DOCUMENTS

| | | | | |
|---|---|---|---|---|
| 5,281,489 A | * | 1/1994 | Mori et al. ............ | 428/690 |
| 5,807,974 A | * | 9/1998 | Kim et al. ............ | 528/366 |
| 5,817,430 A | * | 10/1998 | Hsieh ................. | 428/690 |
| 6,007,928 A | * | 12/1999 | Sakakibara et al. ..... | 428/690 |
| 6,309,763 B1 | * | 10/2001 | Woo et al. ............ | 428/690 |

OTHER PUBLICATIONS

Ng. et al., "Alternating block copolymers . . . fluorescent polymers", Synthetic Metals 94, pp. 185-191 (1998).*
Synthetic Metals; 83 (1997) 615-618; Highly Efficient Green Light-Emitting Diodes with Aluminum Cathode; Do-Hoon Hwang, et al.; pp. 615-618; Elsevier Science S.A., 1997.
MEH-PPV: Improved Synthetic Procedure and Molecular Weight Control; C. J. Neef and J. P. Ferraris; pp. 2311-2314; Macromolecules, vol. 33, No. 7, Apr. 4, 2000.

* cited by examiner

*Primary Examiner*—Marie Yamnitzky
(74) *Attorney, Agent, or Firm*—Gardere Wynne Sewell LLP

(57) ABSTRACT

Generally, and in one form, the present invention is a composition of light-emitting block copolymer. In another form, the present invention is a process producing a light-emitting block copolymers that intends polymerizing a first di(halo-methyl) aromatic monomer compound in the presence of an anionic initiator and a base to form a polymer and contacting a second di(halo-methyl) aromatic monomer compound with the polymer to form a homopolymer or block copolymer wherein the block copolymer is a diblock, triblock, or star polymer. In yet another form, the present invention is an electroluminescent device comprising a light-emitting block copolymer, wherein the electroluminescent device is to be used in the manufacturing of optical and electrical devices.

28 Claims, 12 Drawing Sheets

LIGHT-EMITTING BLOCK COPOLYMERS COMPOSITION, PROCESS AND USE

The U.S. Government may own certain rights in this invention pursuant to the terms of Department of Energy grant H0506-0019-23.

TECHNICAL FIELD OF THE INVENTION

The present invention relates to block-copolymerization, and more specifically to the composition, process and use of light-emitting block copolymers, including diblock, triblock, and star polymers, in, for example optical and electrical applications.

BACKGROUND OF THE INVENTION

Research into light producing polymers began over a decade ago with the discovery that polyphenylene-vinylenes or PPVs are electroluminescent when sandwiched between two electrodes. Further processing of these polymers has led to the early development of electronically driven organic lasers and liquid crystalline coil block copolymers.

There are efforts to construct efficient luminescent and electroluminescent devices with both high efficiency and light output. The synthetic methodology for the construction of polymers that can be used for applications such as light-emitting diodes, field effect transistors, and photovoltaic devices requires very precise placement of the conjugated units. In these highly conjugated structures the substituents on the aromatic rings can play a key role in the control of the optical and electrical properties of the polymers. It is desirable that the process and components yield end products that have narrowly defined molecular weight distributions and can be synthesized in a controlled fashion.

In order to obtain more electronically efficient structures, copolymers containing alternating PPV blocks have been produced. Unfortunately, these copolymers are either of low molecular weight (MW), or display high polydispersity values that have deleterious effects on the lifetime and usefulness of any device into which they are incorporated. Copolymers with relatively high MW have been reported. However, these copolymers have high polydispersity values (greater than 2 and 3) and are inefficiently produced, requiring several re-precipitations before isolating the final product.

The present invention addresses the above-described problems. The block copolymer compositions of the present invention and those produced by the process of the present invention have desirable properties including narrow molecular weight distributions that are produced in a controlled and reliable manner.

SUMMARY OF THE INVENTION

In order to produce stable durable, highly efficient and cost-effective optical and/or electrical devices, there is a need for high molecular weight light-emitting copolymers with narrow molecular weight distributions that exhibit high reproducibility and low defects from batch to batch during production. Block copolymers with a low number of defects are essential to reduce the deleterious effects on the lifetime of the device that incorporates the light-emitting block copolymer.

The present invention includes the addition of an aromatic monomer to a large excess of base in the presence of an anionic initiator to produce a living polymer system. The process takes place at low temperatures and increases product yield and uniformity. Both green and red light-emitting polymers can be produced in this process by using aromatic monomers, for example, poly(2-dimethyloctylsilyl)-phenylenevinylene (DMOS-PPV), a yellow-green light-emitting polymer and poly[1-methoxy-4-(2-ethylhexyloxy)]-phenylenevinylene (MEH-PPV), a red-emitting polymer. The block copolymers of the present invention display high molecular weights with narrow molecular weight distributions. Importantly, fractionation is not required in order to achieve the low polydispersity value of the final copolymer. In addition, the synthesized copolymers contain $\leq 1\%$ of defects arising from head-to-head (H—H) coupling, a feature that has been observed to reduce the useful lifetime of light emitting polymers. Applications that may benefit from the use of the block copolymers of the present invention include photo switches, modules, waveguides, transistors, laser and light absorbers, light-emitting diodes, photovoltaic devices, and macromolecule separating membranes.

Generally, and in one form, the present invention is a composition of light-emitting block copolymer comprising one or more domains corresponding to two or more monomeric units, wherein the resulting copolymer has a polydispersity index of less than 1.5.

In another form, the present invention is a process of producing a light-emitting block copolymer that intends polymerizing a first di(halo-methyl) aromatic monomer compound in the presence of an anionic initiator and a base to form a polymer and contacting a second di(halo-methyl) aromatic monomer compound with the polymer to form a block copolymer, wherein the block copolymer is a diblock, triblock, or star polymer.

In still another form, the present invention is an electroluminescent device comprising a light-emitting block copolymer further comprising one or more domains corresponding to two or more monomeric units, wherein the resulting copolymer has a polydispersity index of less than 1.5. For such a device, the light-emitting block copolymer serves as a luminescent layer. The luminescent layer is cross-linked by one of the group consisting of heat, irradiation and combinations, thereof, and is a blend of the light-emitting block copolymer with an at least one macromolecule for general use. The at least one macromolecule for general use is selected from the group consisting of polyvinylcarbazole, polymethylmethacrylate, polyacrylate, polystyrene, polycarbonate, polyvinylchloride, polyethylene, polypropylene, polyacrylonitrile, polyvinylpyrrolidone, polyvinylalcohol, polyvinylacetate, polyvinylbutyral, polyvinylamine, polycaprolactone, polyethyleneterephthalate, polybutyleneterephthalate, polyurethane, acrylonitrilestyrenebutadiene (ABS), polysulfone, polyvinylfluoride, acetal, polyamide, polyimide, polyester, alkyd, urea, furan, nylon, melamine, phenol, silicone, and epoxy. The electroluminescent device is to be used in the manufacturing of optical and electrical devices.

Other features and advantages of the present invention shall be apparent to those of skill in the art upon reference to the following detailed description taken in conjunction with the accompanying drawings, and such subject matter constitutes a portion of the present invention.

BRIEF DESCRIPTION OF THE DRAWINGS

The above and further advantages of the invention are better understood by referring to the following description in conjunction with the accompanying drawings in which corresponding numerals in the different FIGUREs refer to corresponding parts in which.

DETAILED DESCRIPTION OF THE INVENTION

Figure 1:
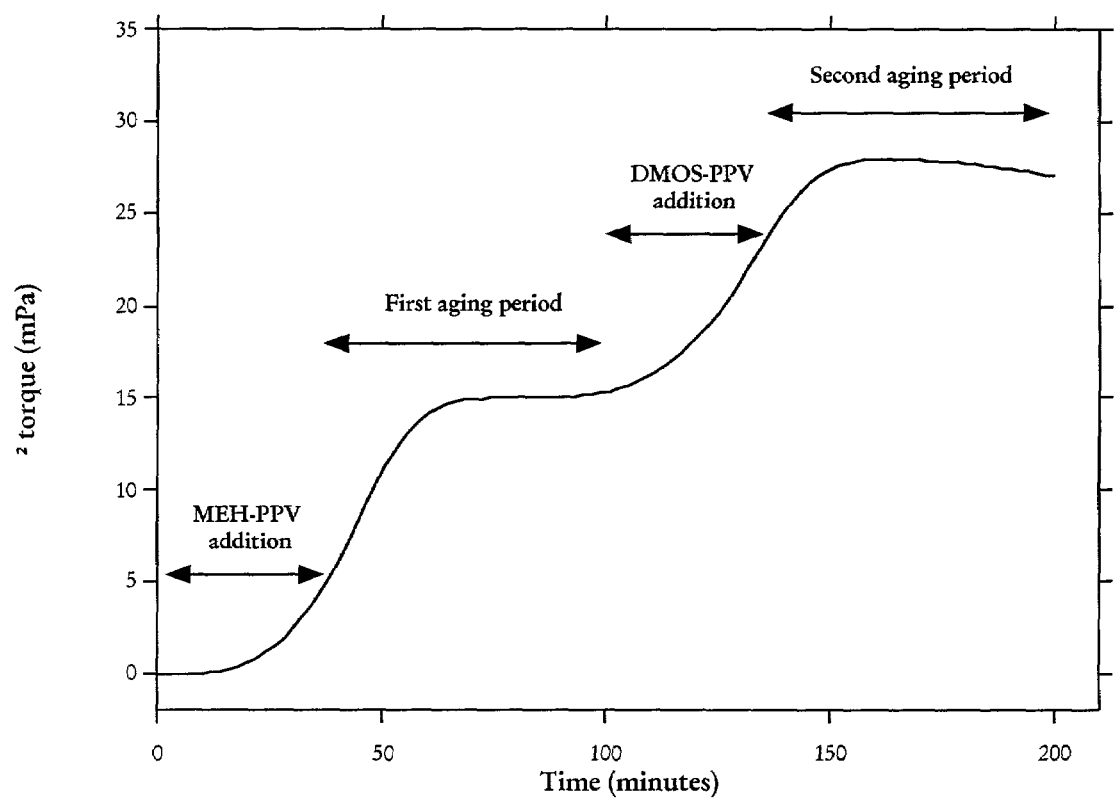
FIG. 1 depicts the torque measurement of the polymerization of MEH-PPV monomer, followed by addition of DMOS-PPV monomer in the presence of 2.5 mole % p-methoxyphenol at 0 degrees Centigrade and a stirring rate of 250 rpm, in accordance with the present invention.

While making and using various embodiments of the present invention are discussed herein in terms of light-emitting block copolymers, it should be appreciated that the present invention provides many applicable inventive concepts that can be embodied in a wide variety of specific contexts. The specific embodiments discussed herein are merely illustrative of specific ways to make and use the invention, and do not limit the scope of the invention.

To facilitate the understanding of this invention, a number of terms are defined below. Terms defined herein have meanings as commonly understood by a person of ordinary skill in the areas relevant to the present invention. Terms such as "a," "an," and "the" are not intended to refer to only a singular entity, but include the general class of which a specific example is used for illustration. The terminology herein is used to describe specific embodiments of the invention, but their usage does not limit the invention, except as outlined in the claims.

As used throughout the present specification the following abbreviations and symbols are used: MW, molecular weight; nm, nanometer; g, gram; ppm, parts per million; THF, tetrahydrofuran; MHz, megahertz; λ, wavelength of light; mL, milliliter; UV, ultraviolet light; PPV, polyphenylenevinylenes; MEH-PPV, poly[1-methoxy-4-(2-ethylhexyloxy)]-phenylenevinylene; DMOS-PPV, poly(2-dimethyloctylsilyl)-phenylenevinylene; H—H, head-to-head.

As used herein, "monomer," "monomer unit" or "monomeric unit" is a compound that generally has at least one polymerizable site per molecule and is linked to one or more like or unlike monomer units to form a larger compound such as a polymer or copolymer. Monomers that are copolymerized by the process of the present invention include, but are not limited to di(halo-methyl) aromatic compounds. The monomers typically contain one or more substituents. As used herein, monomer may refer to a unit of a block copolymer and, as a result, monomer and polymer may be used interchangeably.

As used herein, "copolymer" is a polymer that is made by the stepwise polymerizing of two or more different monomers. A copolymer includes block copolymers such as diblock, triblock and star polymers. The block copolymers of the present invention are generally able to undergo continuous polymerization. Such polymers and copolymers are considered to be living. As used herein, a "living polymer" is one that is continuously built upon by adding on additional chains, monomers, monomer units or monomeric units. In order to obtain the desired block copolymers from living polymers, the latter are deactivated by a reaction with a source of protons that may consist, for example, of an alcohol, water, or a protic acid.

As used herein, the term "initiator" is an anionic compound that forms the source or anchor of a polymer chain. Typically, it is a hydroxyaromatic compound that has been deprotonated and the deprotonated hydroxyl group serves as an initiation site. The present invention contemplates the use of polyhydroxyaromatic compounds as initiator precursors. For example, diblock copolymers are generally made from monofunctional initiators by polymerizing monomer (A) first (the first block) and then adding the second monomer (B) to form the A-B diblock. When a difunctional initiator is used, polymerization of monomer (A) occurs from both sites and this polymer is then capped with a second polymer from monomer (B) to form an A-B-A or B-A-B triblock copolymer. It is also possible to form an A-B-C triblock from a monofunctional initiator, and to form other block polymers from difunctional initiators. In this case, the initiator precursor is deprotonated to produce an initiator with two or more initiation sites. Such initiators are referred to herein as "polyfunctional." When a polyfunctional initiator contains two initiation sites, the resulting composition may be a polymer that has two block copolymer chains coming off of the same anchor molecule. When there are three or more initiation sites in a single polyfunctional initiator the resulting polymer is referred to as a star polymer having chains of block copolymer coming off of each inititation site of a single anchor molecule.

All technical and scientific terms used herein have the same meaning as commonly understood by one of ordinary skill in the art to which this invention belongs, unless defined otherwise. All publications mentioned herein are incorporated herein by reference to disclose and describe the methods and/or materials in connection with which the publications are cited.

Polyphenylene-vinylenes (PPVs) and their derivatives are being studied for use in lighting and displays. However, PPV (a green-yellow light-emitting polymer) is insoluble, intractable, and infusible which makes it difficult to process. PPV derivatives (homopolymers and copolymers) with enhanced processibility and high light-emitting efficiency have been reported. Typically, long alkyl chains are attached to the polymer backbone to induce solubility. Two widely studied PPVs are the red-emitting poly[1-methoxy-4-(2-ethylhexyloxy)]-phenylenevinylene (MEH-PPV), first reported by Wudl and Gordana and the yellow-green-emitting poly(2-dimethyloctylsilyl)-phenylenevinylene (DMOS-PPV) developed by Hwang et al. DMOS-PPV has similar color properties to PPV, but with increased solubility and light-emitting efficiency.

PPVs are made traditionally via the Wessling or the Gilch method. The Wessling method involves treating p-xylene sulfonium salts with an equivalent of base to yield a soluble precursor that is subsequently heated to produce the PPV. The Gilch method involves treatment of α,α'-dihalo-p-xylene with potassium tert-butoxide in organic solvents. In a typical experiment, base is added to the monomer yielding polymers with high molecular weight.

Light-emitting polymers of high molecular weight show improved mechanical stability and excellent, often superior, electroluminescent performance. However, to date, the polymers that have been obtained are generally of broad molecular weight distributions that limit both the reproducibility of polymerization and the optical properties of the final product. Reproducibility of the polymerization is critical, especially if industrial applications are to be successful.

It has recently been reported that MEH-PPV can be obtained in the presence of small amounts of an initiator, for example, deprotonated 4-methoxyphenol, after reversing the order of addition (i.e., monomer added to a base). Polymerization under these conditions is found to yield polymers with very low polydispersity values.

The block copolymers of the present invention are formed via anionic polymerization. Anionic polymerization is normally associated with "living" polymers. Living polymers, as herein defined, are polymers that retain their ability to propagate and grow while their degree of termination is still negligible. One advantage of living polymerization is that the process produces copolymers with narrow molecular weight distribution. In addition, the living ends of the copolymers allow for the synthesis of several different copolymer architectures. Block copolymers, herein referred to as copolymers that have two or more sequences of distinct monomer units that are covalently linked, are one such type of copolymer architecture. The advantage of block copolymers of the present invention is that their properties are different from random copolymers and that the block copolymers can be variably produced to "tune" the emission color and to improve their optical efficiency.

Homopolymerization and Block Copolymerization

The examples use chemicals obtained from the Aldrich Chemical Co., and generally used as received. $^1$H-NMR spectra of the copolymers were obtained using JEOL FX-270 MHz using TMS as an internal standard. The relative composition of the copolymers was calculated from the ratio of the signal at 3.6–4.1 ppm (for methyl, and methylene protons attached to oxygen) and the signal at 0.28–0.56 ppm, a signal that corresponding to the methyl protons attached to silicon. Torque measurements were recorded using a Contraves model 115 rheomat/rheostat. Molecular weights were obtained via gel permeation chromatography (GPC), using a Phenomenex phenogel (5 micrometers; 300 mm×7.8 mm) column with a Viscotek T60 and LR40 triple detector. Data were analyzed using the computer software, TriSEC Light Scattering software, version 3.0. Ultraviolet (UV) light data were collected using a UV/Visible spectrophotometer (Lambda 9) by Perkin-Elmer. Emission spectra were collected using a Jobin-Yvon fluorimeter controlled by Datamax software.

For purposes of understanding the examples presented herein, the structure of DMOS-PPV and MEH-PPV are given below.

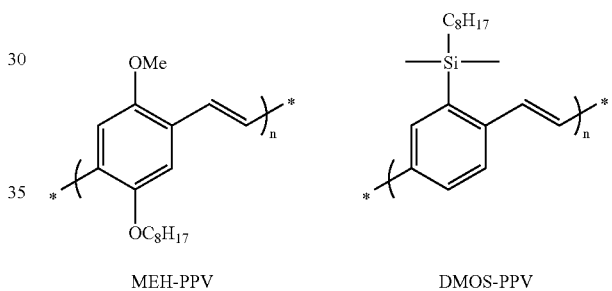

MEH-PPV                    DMOS-PPV

Monomer synthesis. MEH-PPV is synthesized according to a procedure previously reported in the literature. (Neef, C. J., Ferraris, J. P. *Macromolecules* 2000, 33, 2311–2314) DMOS-PPV is synthesized as illustrated in SCHEME 1. Accordingly, 2-bromo-p-xylene (1 equivalent) is treated with about 1.1 equivalents of n-butyl lithium (n-BuLi) at −78 degrees Centigrade. After aging the anion for 1 or 2 hours, 1.1 equivalents of chlorodimethyloctylsilane (DMOS-Cl) is added. The reaction mixture is then heated to reflux for about 4–6 hours. The reaction mixture is quenched with 20% aqueous ammonium chloride. Following quenching, the layers are separated and the aqueous layer back-extracted with a carboxylic acid derivative such as, ethyl acetate. The organic layers are combined and dried over magnesium sulfate, followed by the evaporation of the solvent under reduced pressure. Vacuum distillation is performed at 121 degrees Centigrade and 0.2 mm Hg. This process affords the preparation of a pure intermediate, AI, with a high yield of about 88%–92%. Treatment of this product by bromination, using N-bromosuccinimide (NBS), results in the production of the crude monomer. The bromination of AI is carried out in a hexane and is mediated by either benzoyl peroxide (BPO) or by light. Separation is performed by column chromatography to produce the pure monomer, PM, in a yield of at least about 45%–50%.

SCHEME 1

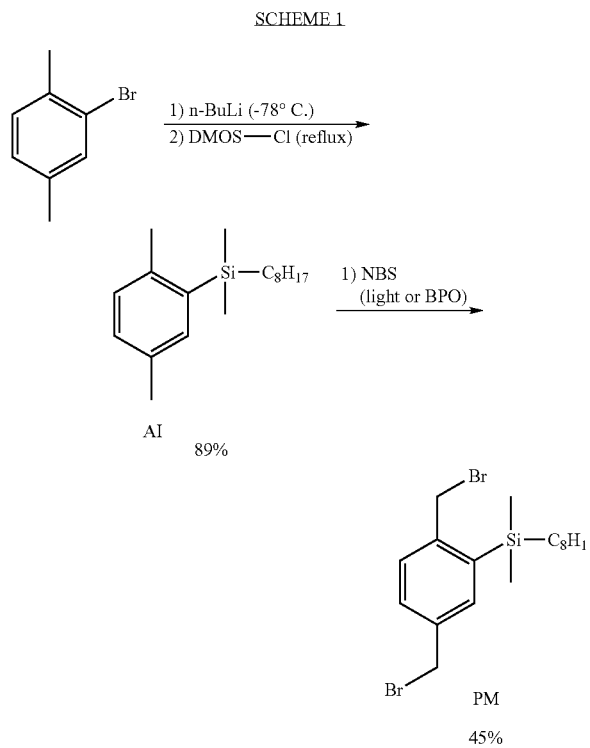

AI
89%

SCHEME 2

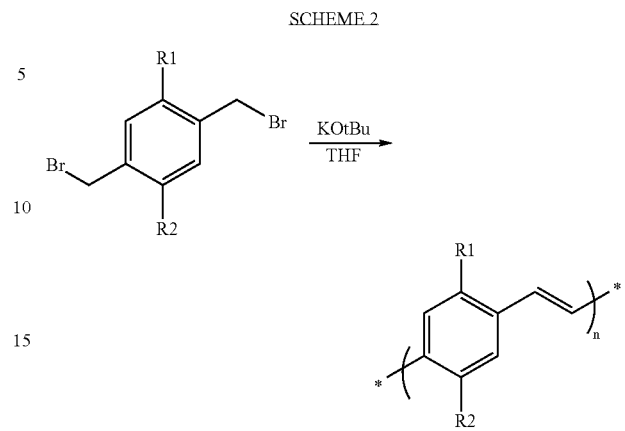

General synthetic route for homopolymer synthesis. The homopolymer is synthesized using the anionic initiator, 4-methoxyphenol at varying concentrations (0, 5.7, or 14 mg), along with 2.2 g (18.7 mmol) of 95% potassium tert-butoxide (KOtBu). Weighing and transfer of the reagents into a three-neck round bottom flask is performed inside a nitrogen-filled glove box. The flask is subsequently taken out of the glove box and THF (80 mL) is transferred to the flask using a syringe. The solution is stirred by attaching a mechanical stirrer during the THF transfer and keeping the flask flushed with nitrogen. The mixture is stirred at 130 rpm or 250 rpm while keeping the flask inside a cooling bath. A solution of the monomer (2 g or 4.6–4.7 mmol in 20 mL THF) is added at 20 mL/hour using a syringe-pump. The subsequent solution may change color depending on the light-emitting monomer that is added. For example, the solution may turn red with the addition of MEH-PPV. A bright yellow-green color may develop when DMOS-PPV is added. Stirring and cooling is continued for about two–twelve hours after monomer addition is complete. The mixture is then quenched by pouring the solution into a rapidly stirred mixture of 500 mL methanol with 50 mL water.

The polymer is collected on a 0.45 micrometers membrane filter and dried under vacuum overnight at 50 degrees Centigrade. For the synthesis of MEH-PPV, the reaction mixture is further thinned with THF prior to its methanol/water precipitation. An example of the synthesis is outlined in SCHEME 2, where R1 and R2 are like or unlike strong electron-withdrawing group substituents or electron releasing group substituents that serve as functional groups, including but not limited to groups such as alkyl, aryl, alkoxy, aryloxy, halogen, nitrile, and variations thereof, and n is an integer of at least 1.

Anionic polymerization of DMOS-PPV. DMOS-PPV copolymer is synthesized similar to MEH-PPV with synthesis is at 0 degrees Centigrade. No further fractionation or purification is required to achieve high yield with low molecular weight distribution.

Copolymer synthesis. MEH-PPV copolymer is obtained following the procedure outlined below. MEH-PPV monomer (1 g) is dissolved in 10 mL THF. After addition is complete, the mixture is allowed to react for 90 minutes followed by the addition of a second monomer. DMOS-PPV (1 g in 10 mL THF) is added and the mixture is allowed to react for 1.5–2.0 hours. THF (50 mL) is subsequently added to create a thinner material. Quenching and collection of the copolymer is performed similar to that described previously for monomer synthesis.

TABLE 1 shows that in the present invention, molecular weight of the polymer decreases in the presence of an anionic initiator. TABLE 1 also reveals that in the present invention, synthesis of DMOS-PPV results in a polydispersity value of less than or equal to 1.11. In addition, lower polydispersity occurs at a higher agitation rate of 250 rpm (see MEH-PPV, Entry 3 vs. Entry 4).

TABLE 1

Summary of DMOS-PPV and MEH-PPV Homopolymerization and Block Copolymerization.

| Entry | Polymer | % Initiator | % Yield | MW (x 10³) | MW/Mn |
|---|---|---|---|---|---|
| 1 | DMOS-PPV | 0 | 65 | 435 ± 24[a] | 1.27 |
| 2 | DMOS-PPV | 2.5 | 62 | 275 ± 9[a] | 1.08 |
| 3 | MEH-PPV | 2.5 | 56 | 285 ± 17[a] | 1.87 |
| 4 | *MEH-PPV* | *2.5* | *60* | *292 + 7[a]* | *1.10* |
| 5 | *MEH-DMOS* | *2.5* | *55* | *312[a,b]* | *1.18* |
| 6 | *MEH-DMOS* | *2.5* | *57* | *312 ± 8[a]* | *1.08* |
| 7 | *DMOS-MEH* | *2.5* | *60* | *332[c]* | *1.10* |
| 8 | *DMOS-MEH* | *2.5* | *53* | *320* | *1.10* |

MW/Mn = polydispersity.
Entries in italics (4–9) indicate the experiments performed at 250 rpm.
[a]Average of two samples.
MW and (polydispersity) before addition of the second precursor monomer: [b]186, (2.32); [c]174,(1.19).

Data from TABLE 1 show that a block copolymer displays increased molecular weight after addition of a second monomer (e.g., Entry 5 vs. Entry 7, see TABLE 1 footnotes). Furthermore, the results are reproducible from batch to batch (Entries 5 and 6; Entries 7 and 8).

FIG. 1 shows the changes in torque as monomers are added to produce a block copolymer. For the synthesis of MEH-PPV, the addition of the precursor to excess base results in little or a very slow increase in viscosity and torque as measured by the rheostat controller (as observed in the first 20 minutes). The torque levels off after addition of the monomer is complete.

Figure 2:
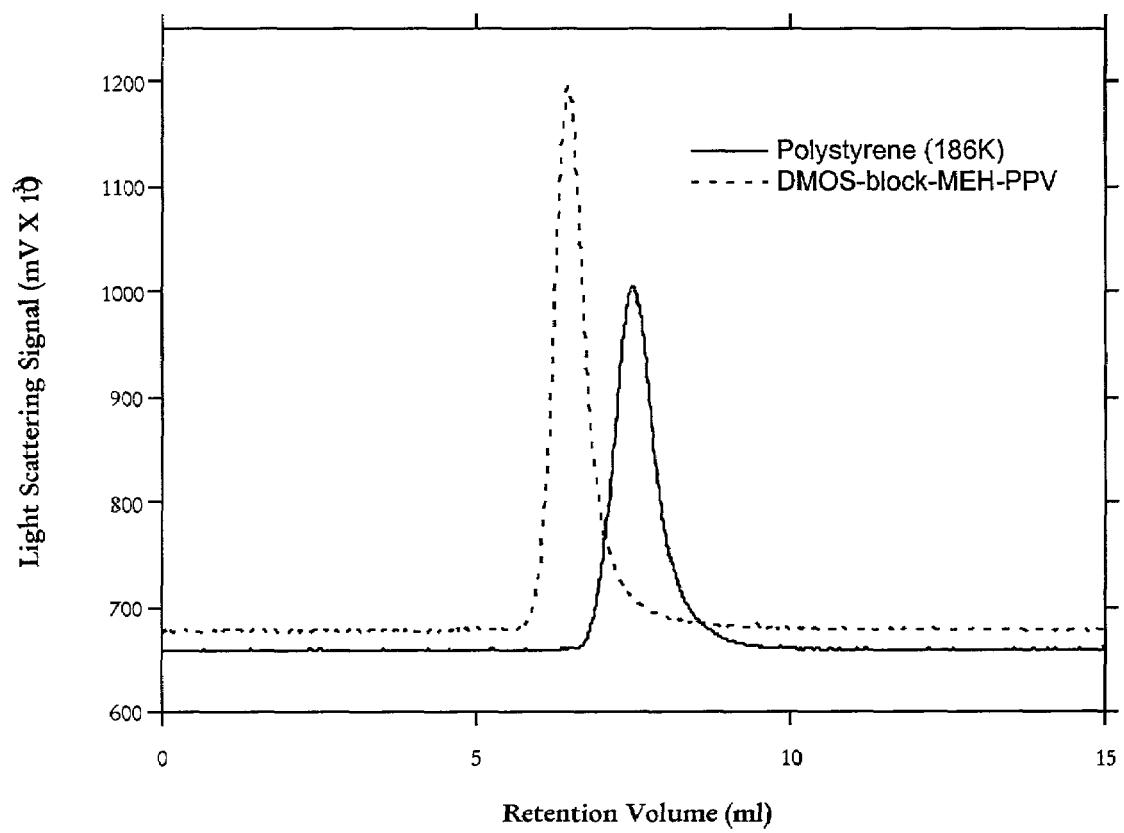
FIG. 2 depicts the light scattering signal of DMOS-block-MEH-PPV and polystyrene (186K) performed at room temperature with tetrahydrofuran (THF) as solvent, in accordance with the present invention.

FIG. 2 illustrates the light scattering signals and narrow polydispersity of a copolymer obtained after addition of MEH-PPV monomer to an ongoing polymerization of DMOS-PPV. The signal corresponding to a polystyrene standard (186K) is shown for comparison; the retention volume of the copolymer is lower than that of the polystyrene standard.

$^1$H-NMR. TABLE 2 shows the relative ratio of monomers in the block copolymers as obtained by $^1$H-NMR. Data are reported as a composition calculated from the ratio of the signal at 3.6–4.1 ppm (for methyl and methylene protons attached to oxygen), and the signal at 0.28–0.56 ppm (for methyl protons attached to silicon). Data show that for each copolymer, a somewhat larger amount (5–8%) of the second monomer is found. A very small signal attributable to head-to-head defects was occasionally detected between 2.7–2.9 ppm (not shown); for the synthesis of both homopolymers and copolymers, the signal is often $\leq$1%.

TABLE 2

MEH-PPV Content in the Block Copolymers as Determined by $^1$H-NMR.

| Copolymer | Run | % MEH-PPV |
| --- | --- | --- |
| MEH-DMOS | 1 | 49 |
| MEH-DMOS | 2 | 47 |
| DMOS-MEH | 1 | 56 |
| DMOS-MEH | 2 | 55 |

Figure 3:
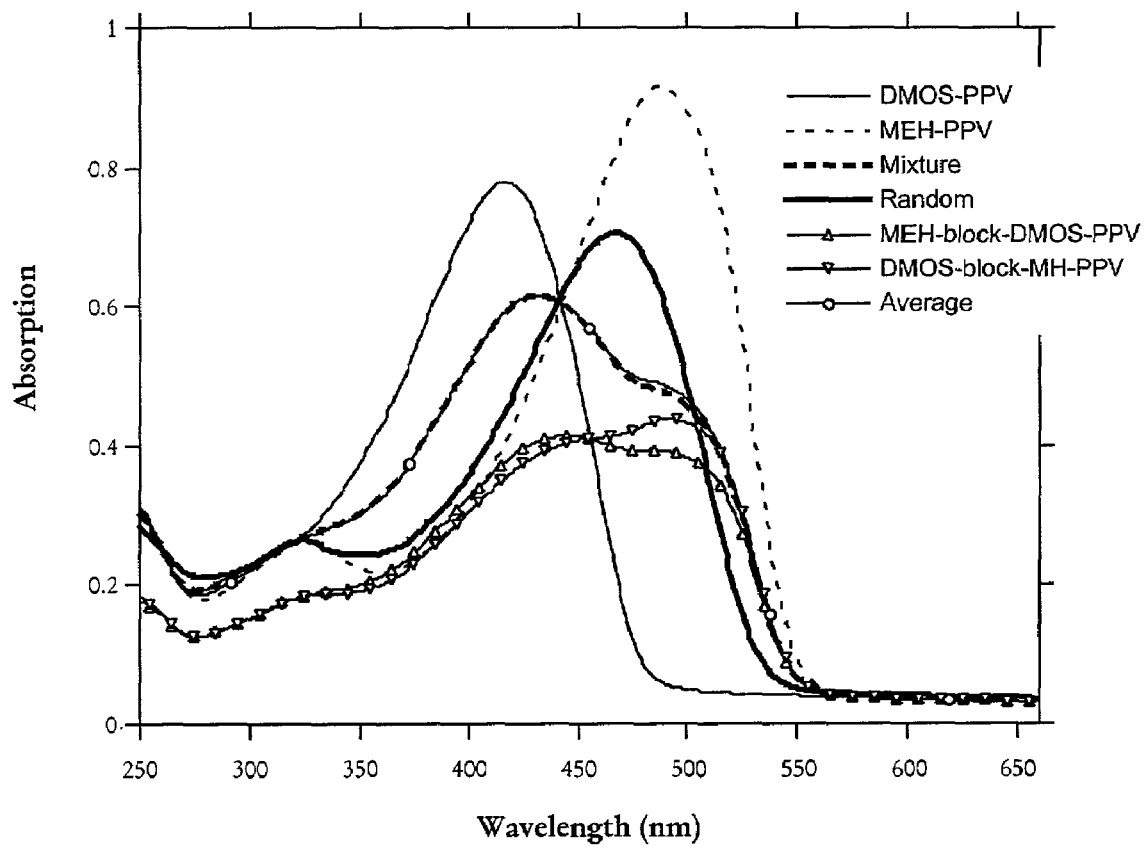
FIG. 3 depicts the absorption spectra of equimolar solutions ($10^{-6}$ M in THF) of homopolymers, copolymers, and a physical mixture of homopolymers, in accordance with the present invention.

Absorption and emission spectra. FIG. 3 shows the UV absorption spectra of the homopolymers and copolymers. In the FIGURE, homopolymers are obtained from samples of copolymerizations taken prior to the addition of the second monomer. For the production of copolymer blocks, a slight shift in the $\lambda_{max}$ values is observed for each homopolymer (e.g., 418 nm and 487 nm for DMOS-PPV and MEH-PPV, respectively). This is compared to the values observed when homopolymerization is carried out (see TABLE 1, Entries 1–4). A physical mixture (50:50) of the homopolymers obtained before addition of the second monomer shows features of both homopolymers. The apparent shift in $\lambda_{max}$ is from the sum of the two absorption signals. The random copolymer (obtained from the polymerization of an equimolar mixture of the two monomers) shows a $\lambda_{max}$ value of 468 nm, a value between those observed for each homopolymer. Copolymers obtained after sequential addition of each monomer also presents features of both homopolymers. The dominant peak in FIG. 3 corresponds to the monomer that forms as the larger component and is in agreement with the relative ratios determined by $^1$H-NMR. Similar to the spectra observed for the mixture of homopolymers, the peaks observed for the above-mentioned copolymers are slightly shifted.

FIG. 3 also shows the absorption spectra observed for block copolymers (DMOS-block-MEH-PPV and MEH-block-DMOS-PPV). The blocks present features of the parent homopolymers as a spectra showing two sets of monomer chains linked together.

Figure 4:
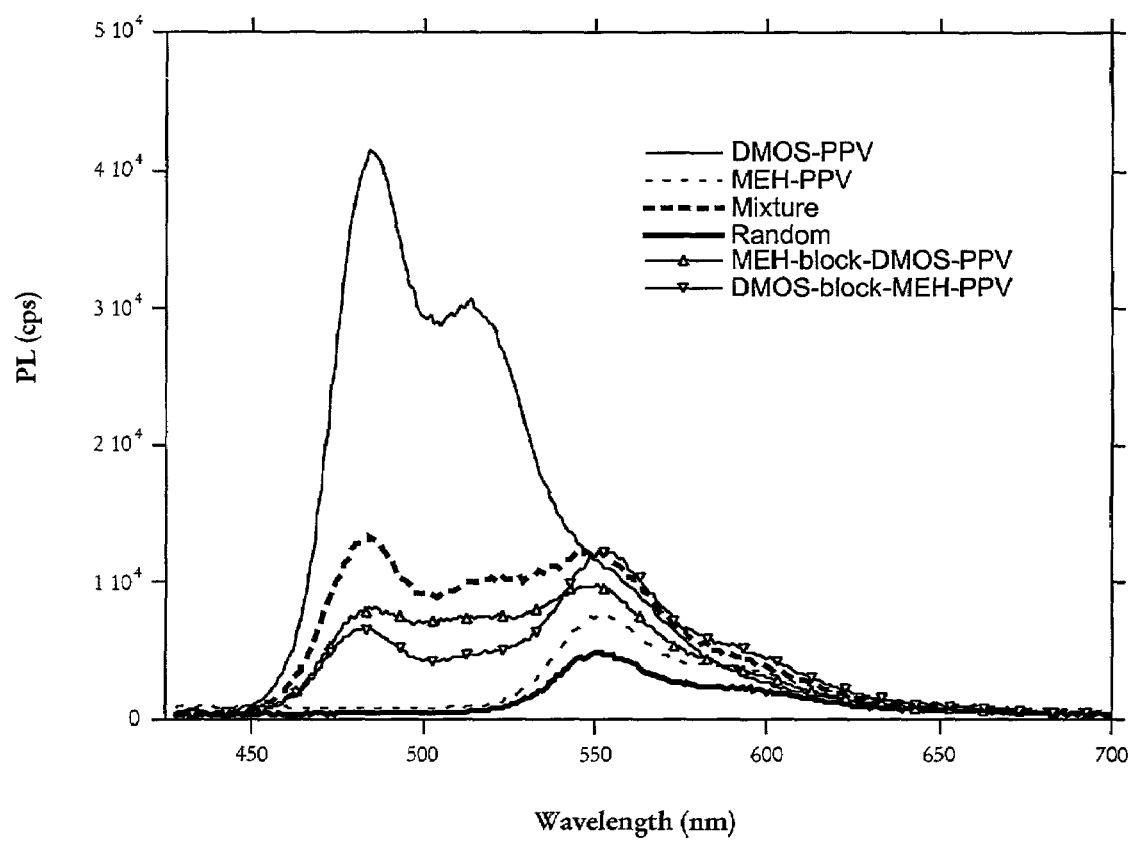
FIG. 4 depicts the photoluminescence spectra of MEH-PPV and DMOS-PPV homopolymers and copolymers in a THF solution ($10^{-6}$ M) at excitation wavelength of 418 nm, in accordance with the present invention.
Figure 5:
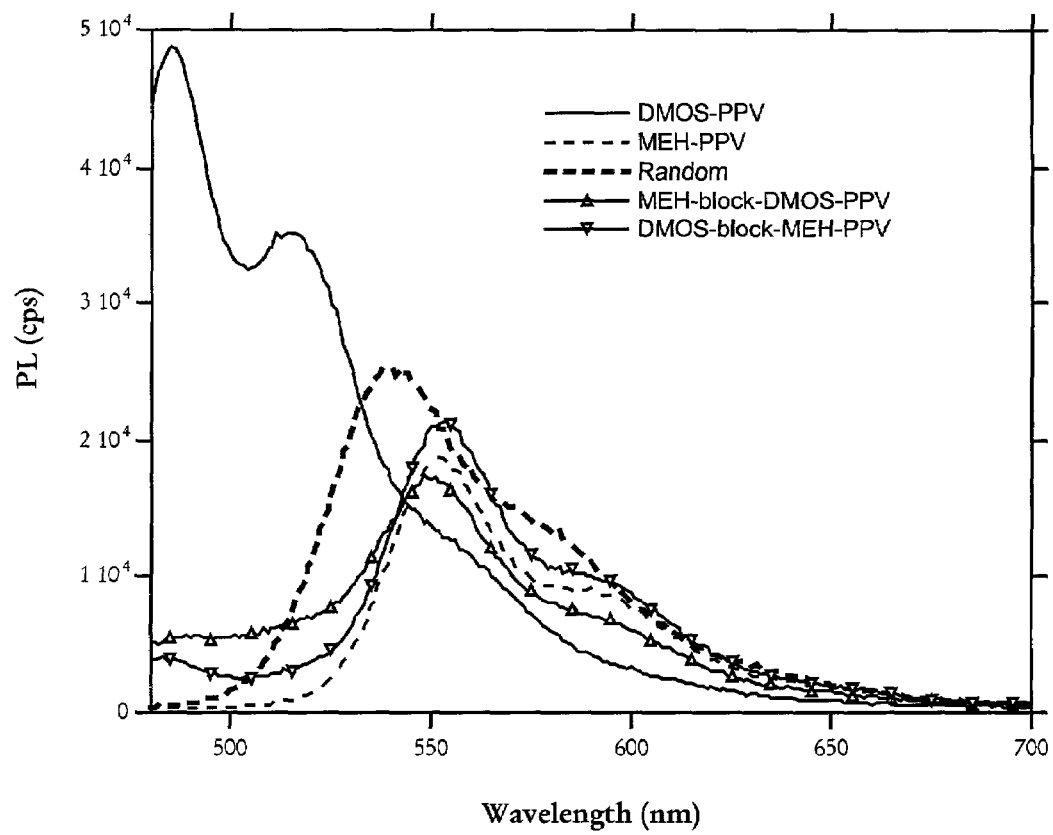
FIG. 5 depicts the photoluminescence spectra of MEH-PPV, and DMOS-PPV homopolymers and copolymers in a THF solution ($10^{-6}$ M) at excitation wavelength of 468 nm, in accordance with the present invention.

FIGS. 4 and 5 illustrate the emission spectra of homopolymers and block copolymers when excited at a signal of 418 nm and 468 nm, respectively, corresponding to the $\lambda_{max}$ values of DMOS-PPV and a random copolymer, respectively. In this example, the emission spectra for the block copolymers (obtained after sequential addition of the two monomers) exhibits features for both parent homopolymers. For the block copolymers, the emission maximum clearly differs from the emission maxima of the random copolymer. Moreover, the emission maxima of the two block copolymers overlap the emission of MEH-PPV at the same wavelength.

Figure 6:
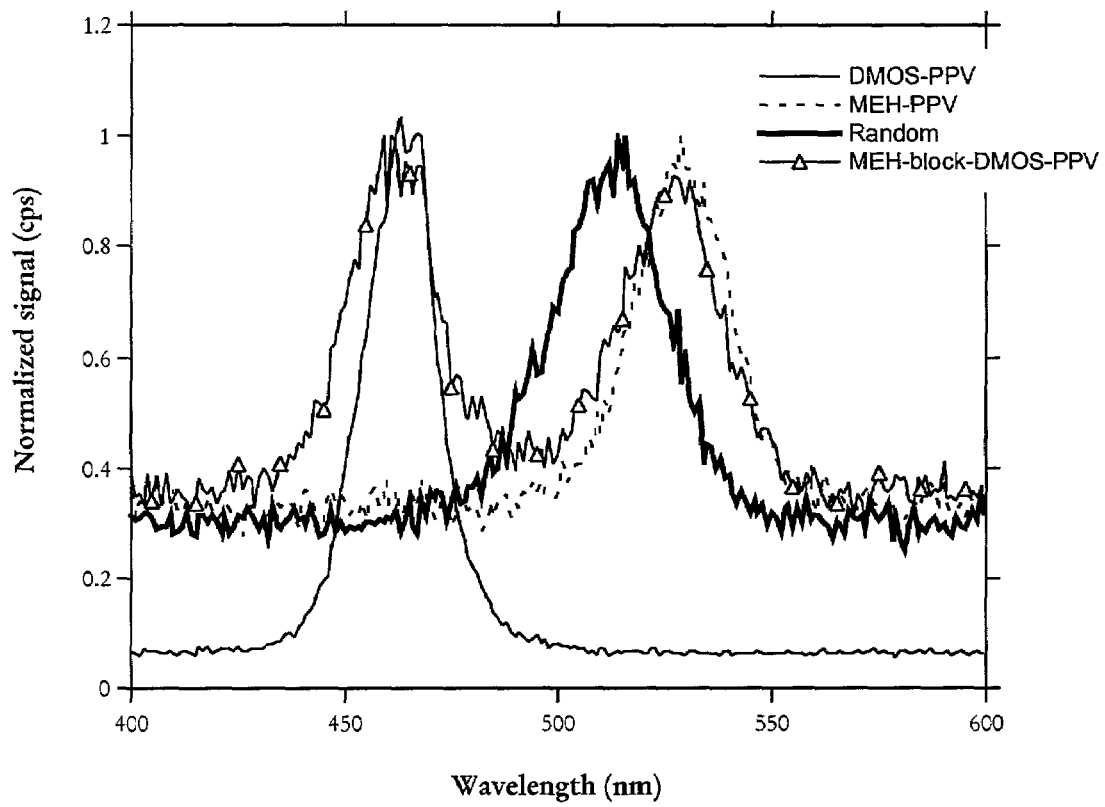
FIG. 6 depicts a synchronous scan of solutions of DMOS-PPV, MEH-PPV, MEH-block-DMOS-PPV, and a random copolymer of DMOS-PPV and MEH-PPV, where each solution is in $10^{-6}$ M THF, in accordance with the present invention.

In FIG. 6, the spectra of the synchronous scan experiments are shown. The block copolymer presents two peaks that overlap with the peaks for the pure polymers DMOS-PPV and MEH-PPV. As in FIG. 5, the random copolymer peak in FIG. 6 is clearly different from the peaks observed for each pure monomer (i.e., MEH-PPV and DMOS-PPV).

The examples show that the present invention, using anionic polymerization at low temperatures, yields high amounts of block copolymers (e.g., MEH-PPV and DMOS-PPV) that exhibit high molecular weight and narrow polydispersity. Block copolymer analysis using $^1$H-NMR shows that the monomer ratio may depend on the monomer that is added last. For block copolymers, the final products exhibit a low content of defects arising from head-to-head coupling, generally <1%.

The control of the molecular weight of MEH-PPV and DMOS-PPV is possible when polymerizations are carried out in the presence of p-methoxyphenol through an anionic pathway. It has been suggested that because the pKa of p-methoxyphenol allows full deprotonation by potassium tert-butoxide, propagation results from nucleophilic attack of the phenoxide on an intermediate quinodimethane formed by dehydrohalogenation of the monomer. Prior art has shown that dehydrohalogenation of α-α'-dihalo-p-xylenes in strong base (i.e. the Gilch route) typically yields high molecular weight polymers with broad molecular weight distributions. The polymerizations at low temperature initiated by p-methoxyphenol as depicted in the present invention has the advantage of yielding high molecular weight polymers with low polydispersity values, without fractionation of the polymer beyond precipitation of the reaction mixture over methanol-water.

Synthesis of Triblock and Star Copolymers of DMOS-PPV and MEH-PPV

Diblock copolymers, triblock copolymers, star homopolymers and block copolymers are made possible via anionic ("living") polymerization methods. The examples below use difunctional and trifunctional initiators to synthesize triblock copolymers as well as star homopolymers and copolymers. Several anionic initiators as previously discussed may be used. Some examples include sulfonyldiphenol (SDP), bisphenol-A (BPA), and phloroglucinol (PHG). Generally, the initiators are hydroxy aromatic derivatives that are soluble in THF with pKa values that allow for the complete deprotonation by potassium tert-butoxide, to generate either two or more phenoxide ions per mole of initiator.

The structures of sulfonyldiphenol (SDP), bisphenol-A (BPA), and phloroglucinol (PHG) are shown below.

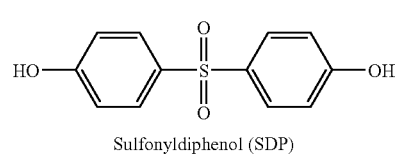

Sulfonyldiphenol (SDP)

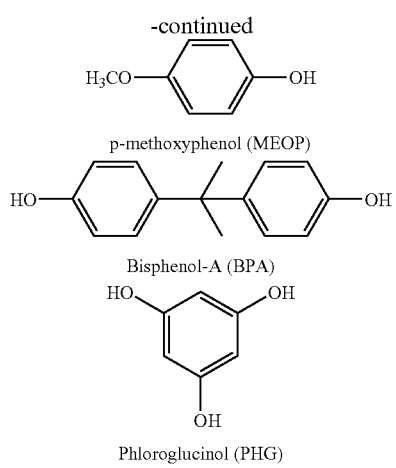

p-methoxyphenol (MEOP)

Bisphenol-A (BPA)

Phloroglucinol (PHG)

Experimental procedures. The homopolymers and copolymers were characterized by their torque profiles obtained during monomer addition and by their absorption and emission spectra. Their compositions were determined by $^1$H-NMR. Chemicals were obtained from Aldrich Chemical Co. and generally used as received. THF was dried over sodium/benzophenone, and distilled under nitrogen prior to its use. Monomers were prepared as previously described. $^1$H-NMR spectra were obtained using a JEOL FX-270 MHz spectrometer using TMS as an internal standard. The compositions of the copolymers were calculated from the ratio of the signal at 3.6 ppm–4.1 ppm (for methyl and methylene protons attached to oxygen), and the signal at 0.28 ppm–0.56 ppm, (corresponding to the methyl protons attached to silicon). Torque measurements were recorded with a Contraves model 115 Rheomat/Rheostat. Molecular weights were obtained via gel permeation chromatography (GPC) using THF on a Phenomenex phenogel (5μ, 300 mm×7.8 mm) column with a Viscotek T60 and LR40 triple detector (refractometer, viscometer, and light scattering). Data were analyzed using Viscotek TriSEC software, version 3.0. UV/is data were collected using a Perkin-Elmer Lambda 9 UV/VIS spectrophotometer. Emission spectra were collected using a Jobin-Yvon fluorimeter, controlled by Datamax software, version 1.03.

General synthetic route for homopolymers synthesis. 2.2 g (18.7 mmol) of 95% potassium tert-butoxide and the initiator were added to a 250 mL three-necked round bottom flask. The amount of initiator was such that the phenol moiety accounted for 2.5 mole % of the monomer feed. Weighing and transfer of the reagents were performed inside a nitrogen-filled glove box. The flask was removed from the glove box, and dry THF (80 mL) was transferred to the flask via syringe. A mechanical stirrer was attached and connected to the Contraves 115 Rheomat, keeping the flask flushed with nitrogen. The mixture was stirred at 250 rpm and the torque was monitored while keeping the flask inside a cooling bath. A solution of 2 g (4.6 to 4.7 mmol) of monomer in 20 mL dry THF was added at 20 mL/hour using a KDS (series 200) syringe-pump. The reaction mixture became viscous as the monomer solution was added. The solution turned red upon addition of the MEH-PPV; a bright yellow-green color developed when the DMOS-PPV monomer was added. Stirring and cooling was continued two hours after monomer addition was complete. The mixture was then poured into a rapidly stirred mixture of methanol (500 mL), and water (50 mL). The polymer was collected on a 0.45 μm membrane filter, and dried under vacuum overnight at 50 degrees Centigrade.

Copolymer synthesis. Copolymers were obtained following the procedure described above with slight modifications. Accordingly, 1 g of MEH-PPV precursor monomer dissolved in 10 mL dry THF was added first via syringe-pump to the THF solution of potassium tert-butoxide and initiator. After addition was complete, the mixture was allowed to react for 60 minutes. 1 g of the DMOS-PPV precursor monomer (in 10 mL THF) was then added, and the mixture allowed to react for 60 minutes after addition of the second monomer was complete. After this second aging period, ~50 mL of THF were added to the reaction mixture to form a thinner paste. Quenching and collection is the same as previously described.

Figure 7:
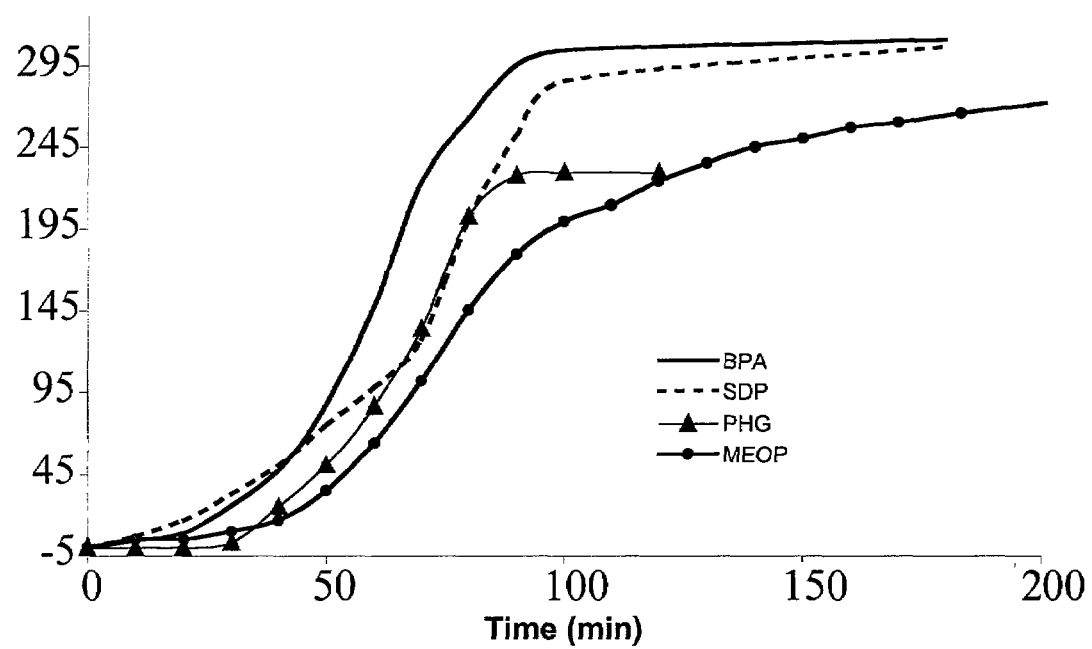
FIG. 7 depicts the torque measurement of the MEH-PPV polymerization in the presence of p-methoxyphenol, sulfonyldiphenol, bisphenol-A, and phloroglucinol, in accordance with the present invention.

Homopolymer results. FIG. 7 shows the torque profile observed during the polymerization of MEH-PPV utilizing different initiators. The amount of initiator was adjusted to provide the same amount (2.5 mole % with respect to the monomer) of the phenol moiety and upon deprotonation served to initiate polymerization. Thus, the mole ratio employed was 2.5 mole % methoxyphenol, 1.25 mole % each of sulfonyldiphenol and bisphenol-A, and 0.833 mole % phloroglucinol The torque profile observed for the monofunctional and difunctional initiators correlated with the molecular weights (TABLE 3, entries 3–6). All these homopolymers displayed molecular weights at about 300,000 with very narrow polydispersity values. The polymerization of MEH-PPV, and DMOS-PPV precursors using phloroglucinol yielded polymers with lower molecular weight than what was observed for the linear polymers and is characteristic of star-shaped polymers.

TABLE 3

Summary of DMOS-PPV and MEH-PPV Homopolymerization and Copolymerization in the Presence of Different Initiators.

| Entry | Polymer | Initiator | % Yield | MW (× 10$^{-3}$) | MW/Mn |
|---|---|---|---|---|---|
| 1 | DMOS-PPV | MEOP | 62 | 275 ± 9 | 1.08 |
| 2 | DMOS-PPV | PHG | 56 | 231 ± 9 | 1.08 |
| 3 | MEH-PPV | MEOP | 60 | 292 ± 7 | 1.10 |
| 4 | MEH-PPV | SDP | 73 | 296 | 1.13 |
| 5 | MEH-PPV | BPA | 64 | 289 ± 6 | 1.12 |
| 6 | MEH-PPV | PUG | 69 | 262 | 1.06 |
| 7 | MEH-DMOS | MEOP | 56 | 312 ± 8$^a$ | 1.13 |
| 8 | MEH-DMOS | SDP | 57 | 333 ± 2$^b$ | 1.17 |
| 9 | MEH-DMOS | BPA | 60 | 326 ± 9 | 1.24 |
| 10 | MEH-DMOS | PHG | 53 | 214$^c$ | 1.23 |
| 11 | MEH-DMOS$^d$ | SDP | 60 | 341 | 1.13 |

MW and (polydispersity) before addition of the second precursor monomer: $^a$186 (1.06), $^b$175 (1.02), $^c$133 (1.31).
$^d$Monomer ratio is 75:25 (MEH-PPV:DMOS-PPV).
Abbreviations include sulfonyldiphenol (SDP), bisphenol-A (BPA), phloroglucinol (PHG), and methoxyphenol (MEOP).

Figure 8:
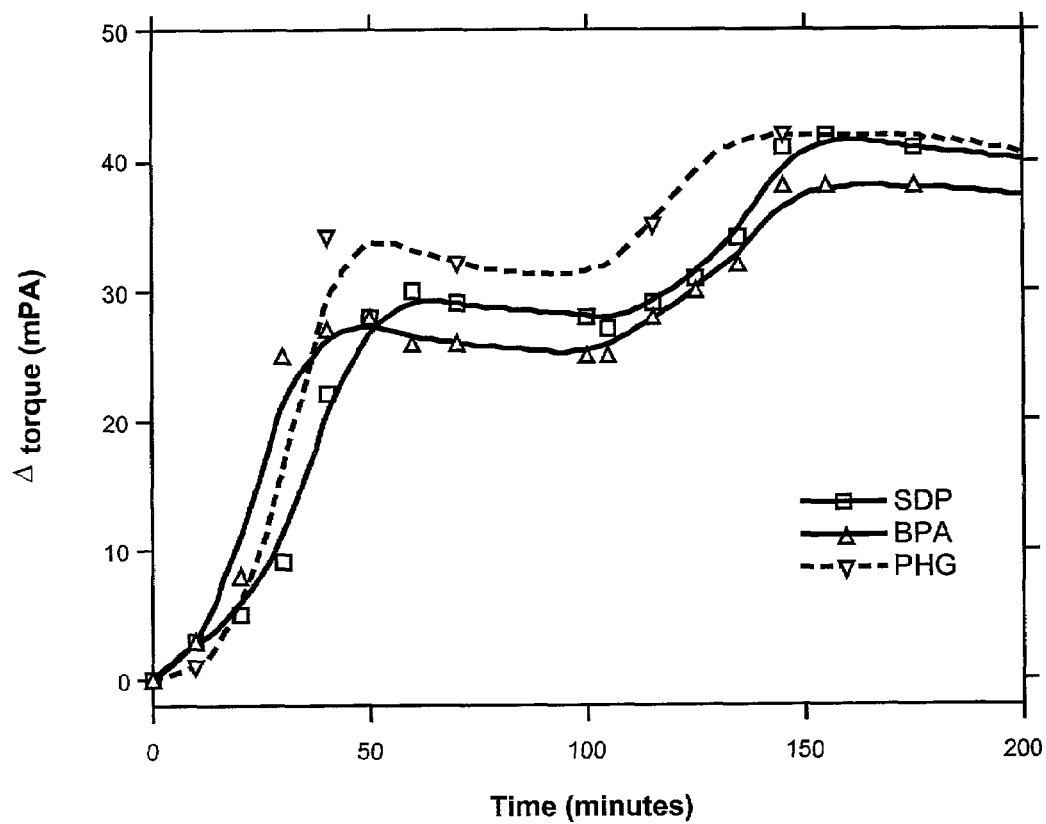
FIG. 8 depicts the torque measurement during block copolymerization of MEH-PPV and DMOS-PPV intitiated by sulfonyldiphenol, bisphenol-A, and phloroglucinol, in accordance with the present invention.

Copolymers of MEH-PPV and DMOS-PPV The torque profile observed during copolymerization in the presence of the difunctional and trifunctional initiators is shown in FIG. 8. Increase in torque was observed during addition of the MEH-PPV precursor; the torque value leveled off when the monomer was consumed, and when DMOS-PPV precursor was added, polymerization resumed and torque increased again. Polymerizations carried out with p-methoxyphenol, and with the difunctional initiators yielded polymers with similar molecular weights (~320,000) with molecular weight distributions between 1.13 and 1.24. Results are summarized in TABLE 3, Entries 7–9. The increase in torque after addition of the second monomer reflected the increase in molecular weight after addition of the second monomer. Thus, for polymerizations initiated by p-methoxyphenol and sulfonyldiphenol, the observed molecular weights before addition of DMOS-PPV monomer were 186,000, and 174,000, respectively. After the second monomer was added and consumed (i.e. at the end of the second aging period), the molecular weights increased to 312,000 and 333,000, respectively, with formation of triblock copolymers.

Polymerizations mediated by phloroglucinol not only yielded polymers with lower molecular weights compared to their linear counterparts, but also lower molecular weight than expected if all the phenol functionalities were participating in the polymerization (see Entries 2, 6, and 10 in TABLE 3 for the molecular weights of DMOS-PPV, MEH-PPV, and MEH-block-DMOS-PPV respectively, in the presence of phloroglucinol).

Star polymers display lower apparent molecular weights compared to their linear analogs due to smaller hydrodynamic volumes which leads to a lower intrinsic viscosity. TABLE 4 shows the intrinsic viscosities of DMOS-PPV, MEH-PPV, and MEH-block-DMOS-PPV obtained from polymerizations initiated by either phloroglucinol or p-methoxyphenol. The values for MEH-PPV were obtained from samples of the copolymerization experiments prior to addition of DMOS-PPV.

TABLE 4

Intrinsic Viscosity Values and Radius of Gyration for Homopolymers and Copolymers.

| Polymer | $IV_{PHG}$ (dL/g) | $IV_{MEOP}$ (dL/g) | f | $Rg_{PHG}$ (nm) | $Rg_{MEOP}$ (nm) |
| --- | --- | --- | --- | --- | --- |
| DMOS-PPV | 0.928 | 1.218 | 3.08 | 18.79 | 22.85 |
| MEH-PPV[a] | 1.628 | 2.323 | 3.45 | 20.64 | 25.98 |
| MEH-DMOS | 1.809 | 2.255 | 2.87 | 22.50 | 28.73 |

[a]MEH-PPV obtained from precipitation of an aliquot of the reaction mixture into methanol-water prior to addition of DMOS-PPV precursor.

The intrinsic viscosity values are lower for the star polymers than for the corresponding linear analogs. The number of arms for the star polymers is close to 3. The number of arms was calculated using the expression $g=(3f-2)/f^2$, where g is the ratio of intrinsic viscosities ($IV_{PHG}/IV_{MEOP}$) and f is the number of arms.

$^1$H-NMR. TABLE 5 shows the relative ratio of monomers obtained by $^1$H-NMR in each corresponding copolymer calculated from the ratio of the signal at 3.6 ppm–4.1 ppm (methyl and methylene protons attached to oxygen), and the signal at 0.28 ppm–0.56 ppm (methyl protons attached to silicon). The copolymer composition was approximately 1:1 for all the copolymers consistent with results obtained for the polymers synthesized with p-methoxyphenol. The signal associated with the head-to-head defects accounted for $\leq 2\%$ and was often absent as in the case of p-methoxyphenol-mediated polymerizations

TABLE 5

MEH-PPV Content in the Copolymers as Determined by $^1$H-NMR.

| Entry | Initiator | % MEH-PPV |
| --- | --- | --- |
| 1 | MEOP | 49 |
| 2 | SDP | 50 |
| 3 | BPA | 53 |
| 4 | PHG | 56 |
| 5 | SDP[a] | 80 |

[a]Monomer ratio is 75:25 (MEH-PPV:DMOS-PPV).

Figure 9:
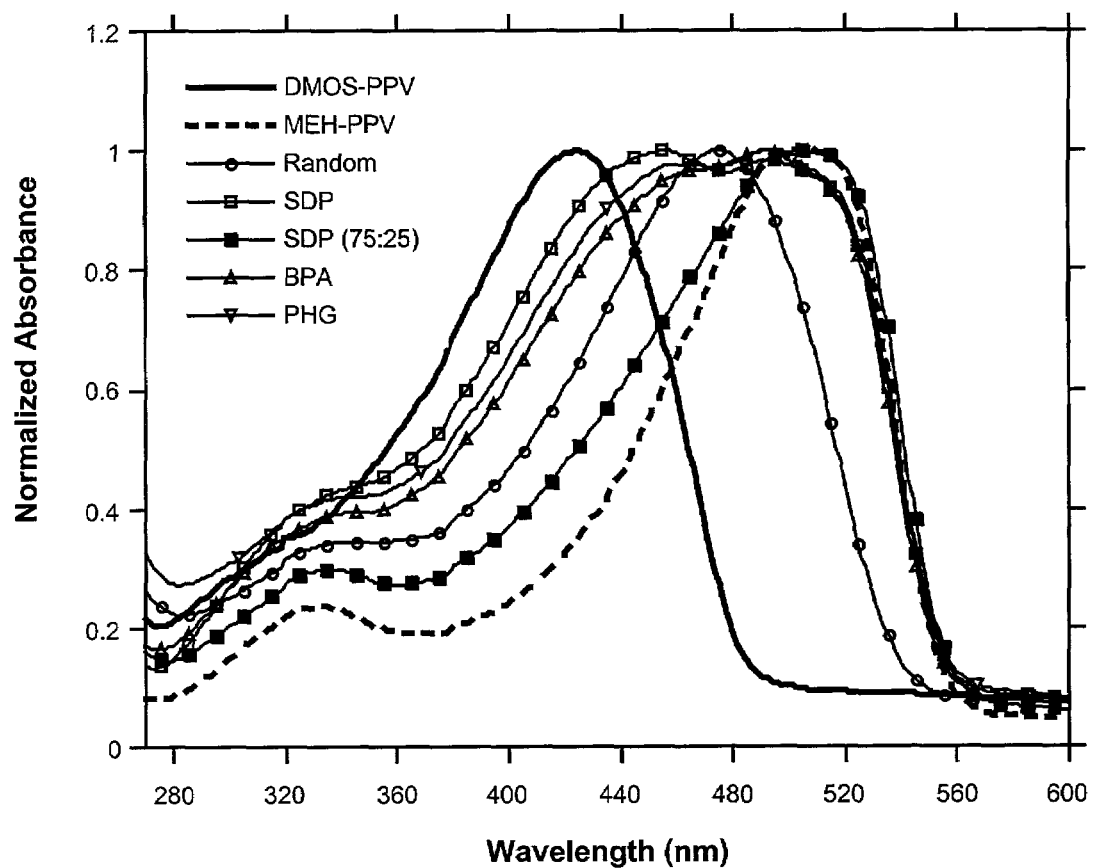
FIG. 9 depicts the absorption spectra of homopolymers, copolymers, and a physical mixture of homopolymers, where each is in a solution of $10^{-5}$ M THF, in accordance with the present invention.

Absorption and emission spectra. FIG. 9 shows the UV/visible absorption spectra of DMOS-PPV, MEH-PPV, and the copolymers synthesized in the presence of the different initiators. The spectra were obtained from copolymers in solution in $10^{-5}$ M THF. The random copolymer (obtained from the polymerization of an equimolar mixture of the two monomers) had a $\lambda_{max}$ value of 475 nm, intermediate to the values observed for each homopolymer as is expected from a statistical copolymer.

The copolymers obtained after sequential addition of each monomer exhibited features of both homopolymers as expected. The dominant peak corresponded to the major component (verified by the relative ratios determined by $^1$H-NMR). The peaks observed were slightly shifted as compared with the peaks observed for the homopolymers, similar to that observed with copolymers initiated with p-methoxyphenol, and correspond to DMOS-PPV and MEH-PPV. When a physical mixture containing a solution of the homopolymers was measured, the $\lambda_{max}$ values observed were also shifted in the similar manner. The absorption spectra do not describe random copolymers because the spectra were qualitatively different.

Figure 10:
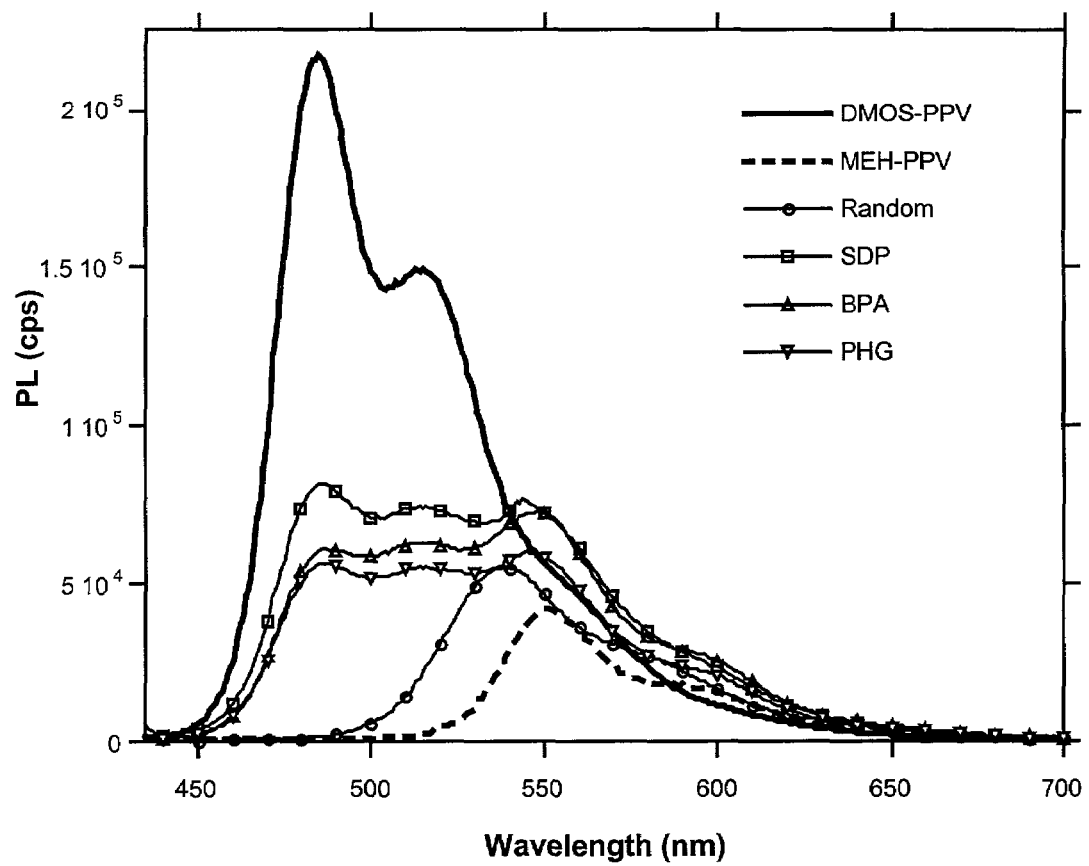
FIG. 10 depicts photoluminescence spectra of MEH-PPV and DMOS-PPV homopolymers and copolymers in $10^{-5}$ M THF solutions at excitation wavelength of 425 nm, in accordance with the present invention.
Figure 11:
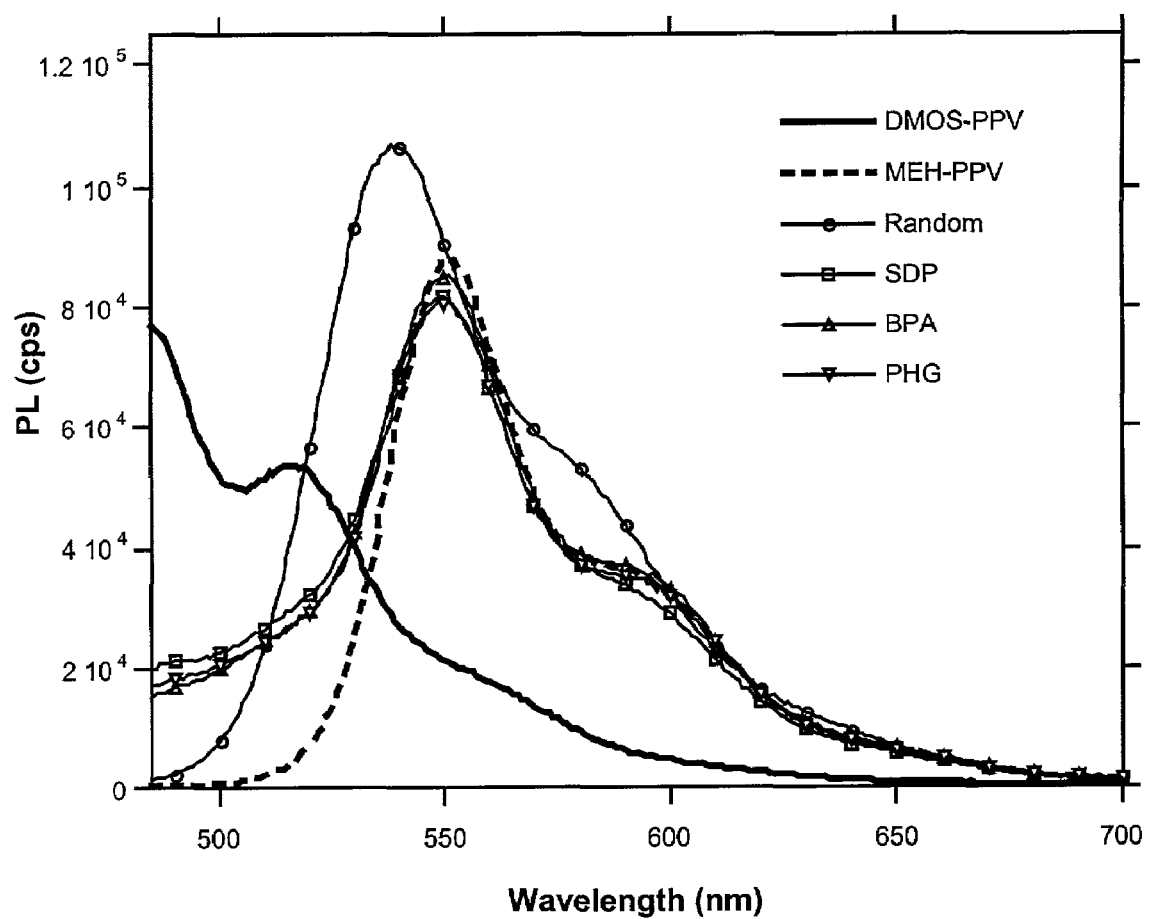
FIG. 11 depicts photoluminescence spectra of MEH-PPV, and DMOS-PPV homopolymers and copolymers in $10^{-5}$ M THE solutions at excitation wavelength of 475 nm, in accordance with the present invention.

FIGS. 10 and 11 show the emission spectra observed when homopolymers and copolymers were excited at 425 nm and 475 nm, wavelengths corresponding to the $\lambda_{max}$ values of DMOS-PPV and the random copolymer, respectively. The emission spectrum for the polymer obtained after sequential addition of two monomers shows features of both parent polymers (FIG. 4). Random copolymerization is excluded from FIG. 5 because the random copolymer emission maximum is clearly different than the emission maxima for the copolymers.

Figure 12:
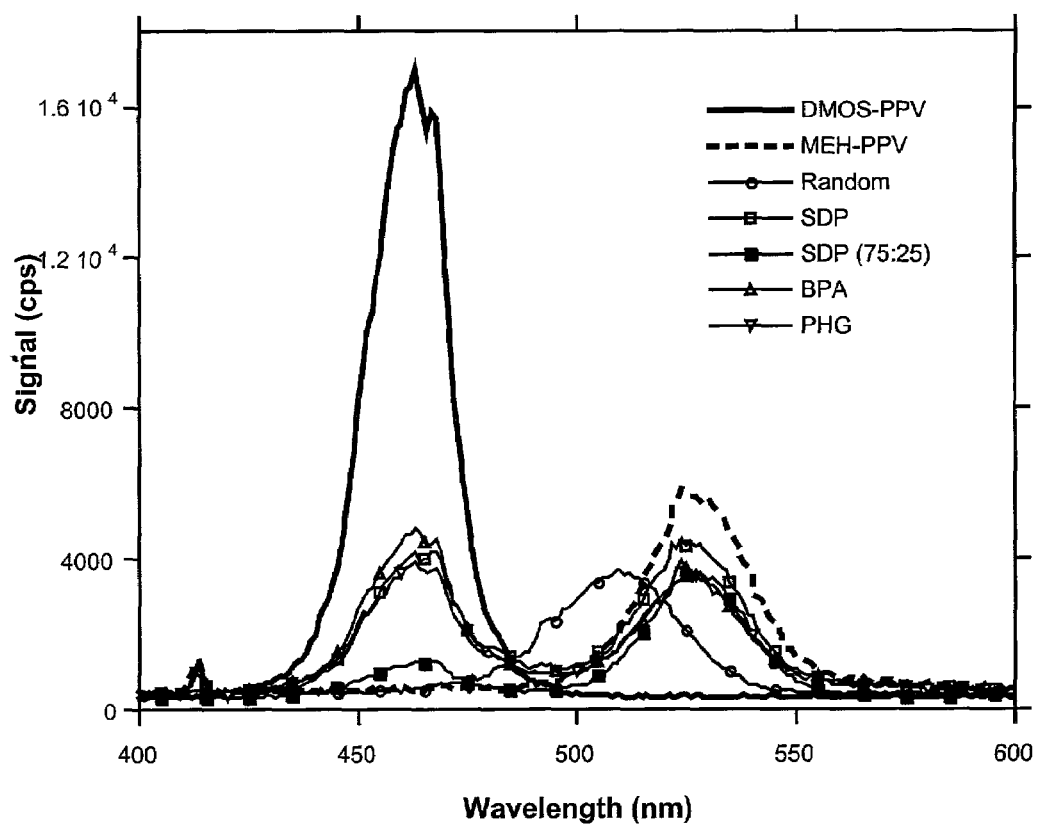
FIG. 12 depicts the synchronous scans of $10^{-5}$ M THF solutions of DMOS-PPV, MEH-PPV, MEH-block-DMOS-PPV (obtained in the presence of each initiator), and a random copolymer of DMOS-PPV and MEH-PPV, where the excitation and emission monochromators were scanned from 400 nm–600 nm with a constant offset of 20 nm, in accordance with the present invention.

FIG. 12 depicts the spectra obtained from synchronous scan experiments that arise from the intersection of the absorption and emission spectra. Here, the copolymer presented two peaks that overlapped with the peaks for pure DMOS-PPV and pure MEH-PPV. The peak corresponding to the random copolymer also differed from the copolymer or the homopolymer peak.

The present invention shows that multifunctional initiators enable the control of the molecular weight of PPV derivatives. For example, triblock copolymers of MEH-PPV and DMOS-PPV were synthesized via anionic polymerization at low temperature in the presence of various initiators such as sulfonyldiphenol, bisphenol-A and phloroglucinol. In addition, homopolymers and copolymers with high molecular weights, and narrow molecular weight distribution were obtained from difunctional intiators. Where polymerization was initiated by phloroglucinol, polymers displayed molecular weights lower than their linear counterpart, a behavior characteristic of star polymers.

Another feature of the anionic polymerizations of the present invention (in addition to its ability to control the molecular weight) is that it allows control of copolymer composition. For example, see TABLE 3 Entry 11 and TABLE 5 Entry 5 where the monomer ratios were 75:25

(MEH-PPV:DMOS-PPV) and the copolymer that was then obtained reflected the initial feed ratio at a final yield concentration of about 20% DMOS-PPV.

The absorption and emission spectra as well as data from the torque profile showed that the anionic polymerization yielded true block copolymer, not random polymers. $^1$H-NMR showed that the copolymer composition reflected the feed composition (approximately 1:1) with a slightly higher amount of the monomer added last. $^1$H-NMR demonstrated that the homopolymers and the copolymers had low contents of defects arising from head-to-head coupling.

Because the block copolymers exhibit superior optical and electrical activity, the copolymers obtained by the process of this invention can be further processed cost-effectively and more efficiently than prior-obtained copolymers into shaped articles, films, or fibers, for example. Copolymers of the present invention may be uniquely suited for use in applications that may include light-emitting diodes, photo switches, modules, waveguides, transistors and field effect transistors, lasers and light absorbers, semiconductor lasers, and photovoltaic devices.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. A light-emitting block copolymer formed by polymerizing a first monomeric repeat unit in the presence of an anionic initiator and a base to form a polymer and contacting a second monomeric repeat unit with the polymer to form a block copolymer, wherein each monomeric repeat unit is derived from a di(halo-methyl) aromatic compound, wherein the resulting block copolymer has a polydispersity index of less than 1.5.

2. The light-emitting block copolymer of claim 1, wherein at least one di(halo-methyl) aromatic compound has one or more ring substituents.

3. The light-emitting block copolymer of claim 2, wherein the substituents are chosen from OCH3, Si[(CH3)2C8H17], and OC8H17.

4. The light-emitting block copolymer of claim 1, wherein the light-emitting block copolymer exhibits less than or equal to 1% defects arising from head-to-head coupling.

5. The light-emitting block copolymer of claim 1, wherein the light-emitting block copolymer displays a polydispersity value of less than 1.11.

6. The light-emitting block copolymer of claim 1, wherein fractionation is not required to achieve a polydispersity value of less than 1.11.

7. The light-emitting block copolymer of claim 1, wherein the light-emitting block copolymer has a number-averaged molecular weight greater than about 200,000.

8. The light-emitting block copolymer of claim 1, wherein one of the monomeric repeat units forms poly[1-methoxy-4-(2-ethylhexyloxy)]-phenylenevinylene upon polymerization.

9. The light-emitting block copolymer of claim 1, wherein one of the monomeric repeat units forms poly(2-dimethyloctylsilyl)-phenylenevinylene upon polymerization.

10. An electroluminescent device comprising a light-emitting block copolymer formed by polymerizing a first monomeric repeat unit in the presence of an anionic initiator and a base to form a polymer and contacting a second monomeric repeat unit with the polymer to form a block copolymer, wherein each monomeric repeat unit is derived from a di(halo-methyl)aromatic compound, wherein the resulting block copolymer has a polydispersity index of less than 1.5.

11. The electroluminescent device of claim 10, wherein the light-emitting block copolymer serves as a luminescent layer for the electroluminescent device.

12. The electroluminescent device of claim 11, wherein the luminescent layer is cross-linked by one of the group consisting of heat, irradiation and combinations, thereof.

13. The electroluminescent device of claim 11, wherein the luminescent layer is a blend of the light-emitting block copolymer with an at least one macromolecule for general use.

14. The electroluminescent device of claim 13, wherein the macromolecule for general use is selected from the group consisting of polyvinylcarbazole, polymethylmethacrylate, polyacrylate, polystyrene, polycarbonate, polyvinylchloride, polyethylene, polypropylene, polyacrylonitrile, polyvinylpyrrolidone, polyvinylalcohol, polyvinylacetate, polyvinylbutyral, polyvinylamine, polycaprolactone, polyethyleneterephthalate, polybutyleneterephthalate, polyurethane, acrylonitrilestyrenebutadiene (ABS), polysulfone, polyvinylfluoride, acetal, polyamide, polyimide, polyester, alkyd, urea, furan, nylon, melamine, phenol, silicone, and epoxy.

15. The electroluminescent device of claim 10, wherein the electroluminescent device is used in the manufacturing of optical and electrical devices.

16. A process of producing a light-emitting block copolymer comprising the steps of:

polymerizing a first monomeric repeat unit in the presence of an anionic initiator and a base to form a polymer; and contacting a second monomeric repeat unit with the polymer to form a block copolymer, wherein each monomeric repeat unit is derived from a di(halo-methyl) aromatic compound and wherein the resulting block copolymer has a polydispersity index of less than 1.5.

17. The process of claim 16, wherein the anionic initiator further comprises a carbanion, aryl oxide, or alkoxide.

18. The process of claim 16, further comprising the use of a solvent.

19. The process of claim 16, wherein each monomeric repeat unit has one or more electron-withdrawing group or electron-releasing group substituents.

20. The process of claim 16, wherein at least one monomeric repeat units has a substituent selected from the group consisting of one or more alkyl groups, aryl groups, alkoxy groups, aryloxy groups, halogen groups, nitrile groups, and combinations thereof.

21. The process of claim 16, wherein one of the monomeric repeat units is derived from a di(halo-methyl) aromatic compound which forms poly(2-dimethyloctylsilyl)-phenylenevinylene, poly[1-methoxy-4-(2-ethylhexyloxy)]-phenylenevinylene or derivatives thereof upon polymerization.

22. The process of claim 16, wherein the base is potassium tert-butoxide.

23. The process of claim 16, wherein the anionic initiator is polyfunctional.

24. The process of claim 16, wherein the process is conducted at a reaction temperature of about 0 degrees Centigrade.

25. The process of claim 16, wherein the anionic initiator is present in an amount of about 2.5 mole % with respect to the first monomeric repeat unit.

26. The process of claim 16, wherein the resulting block copolymer displays a polydispersity value of less than 1.11.

27. The process of claim 16, wherein one of the monomeric repeat units forms poly(2-dimethyloctylsilyl)-phenylenevinylene upon polymerization.

28. The process of claim 16, wherein one of the monomeric repeat units forms poly[1-methoxy-4-(2-ethylhexyloxy)]-phenylenevinylene upon polymerization.

* * * * *